(12) United States Patent
Bastide et al.

(10) Patent No.: US 10,416,859 B2
(45) Date of Patent: *Sep. 17, 2019

(54) ENHANCED CONFIGURATION OF A PROFILE PHOTO SYSTEM

(71) Applicant: International Business Machines Corporation, Armonk, NY (US)

(72) Inventors: Paul R. Bastide, Boxford, MA (US); John M. Boyer, Victoria (CA)

(73) Assignee: International Business Machines Corporation, Armonk, NY (US)

( * ) Notice: Subject to any disclaimer, the term of this patent is extended or adjusted under 35 U.S.C. 154(b) by 99 days.

This patent is subject to a terminal disclaimer.

(21) Appl. No.: 15/244,709

(22) Filed: Aug. 23, 2016

(65) Prior Publication Data
US 2018/0061017 A1   Mar. 1, 2018

(51) Int. Cl.
G06F 3/0484 (2013.01)
H04L 29/08 (2006.01)
G06T 7/00 (2017.01)

(52) U.S. Cl.
CPC ........ G06F 3/04842 (2013.01); G06T 7/0002 (2013.01); H04L 67/306 (2013.01);
(Continued)

(58) Field of Classification Search
CPC ......... G06T 7/0002; G06T 2207/30201; H04L 67/306; G06K 9/00684; G06K 9/00288; G06Q 50/01
(Continued)

(56) References Cited

U.S. PATENT DOCUMENTS 7,899,256 B2    3/2011  Fedorovskaya et al.
7,929,809 B2 *  4/2011  Snowdon ........... H04N 1/00132
                                            358/403
(Continued)

FOREIGN PATENT DOCUMENTS

CN    103942525 A    7/2014

OTHER PUBLICATIONS

"A Method for Suggesting Profile Pictures Based on Social Activity and Photo Quality," Hanson, Courtney and Sanio, Jason, IP.com Prior Art Database Disclosure, IP.com Disclosure No. IPCOM000236531 D, May 1, 2014. http://priorart.ip.com/IPCOM/000236531.*

(Continued)

*Primary Examiner* — Sheela C Chawan
(74) *Attorney, Agent, or Firm* — Pepper Hamilton LLP

(57) ABSTRACT

Embodiments can provide a computer implemented method in a data processing system comprising a processor and a memory, the memory comprising instructions that are executed by the processor to cause the processor to implement a system for providing profile photo enhancement, the method comprising receiving, from a specification source, one or more specifications for image acceptance criteria; receiving, from an uploading user, an image; examining, through an image processing toolbox, the image to determine if all of the image acceptance criteria are met; if all image acceptance criteria are met, accepting the image; and if one or more image acceptance criteria are not met, processing the image. Acceptance criteria can include a predetermined number of focus items, predetermined length and width constraints, predetermined color constraints, predetermined shape constraints, predetermined focus constraints, predetermined contrast ratio constraints, a prede-
(Continued)

termined number of human faces present in the image, and predetermined human face orientation constraints.

17 Claims, 3 Drawing Sheets

(52) U.S. Cl.
CPC ............... *G06T 2207/10024* (2013.01); *G06T 2207/30168* (2013.01)

(58) Field of Classification Search
USPC .................................................. 382/118, 195
See application file for complete search history.

(56) References Cited

U.S. PATENT DOCUMENTS

| | | | |
|---|---|---|---|
| 8,442,265 B1 | 5/2013 | Bosworth et al. | |
| 8,681,235 B2 | 3/2014 | Choi | |
| 8,774,528 B2 | 7/2014 | Hibino et al. | |
| 8,856,541 B1* | 10/2014 | Chaudhury | G06F 21/32 382/115 |
| 8,923,551 B1* | 12/2014 | Grosz | H04N 1/00145 382/100 |
| 9,444,990 B2* | 9/2016 | Jensen | H04N 5/23212 |
| 9,552,535 B2* | 1/2017 | Movellan | G06K 9/00308 |
| 10,013,639 B1 | 7/2018 | Schurman et al. | |
| 2013/0189650 A1 | 7/2013 | Lee et al. | |
| 2014/0077932 A1 | 3/2014 | Rooyakkers | |
| 2014/0093141 A1 | 4/2014 | Myers et al. | |
| 2015/0213091 A1* | 7/2015 | Laight | H04L 51/32 707/758 |
| 2018/0061017 A1* | 3/2018 | Bastide | G06F 3/04842 |
| 2018/0061033 A1* | 3/2018 | Bastide | G06T 7/0002 |

OTHER PUBLICATIONS

Ralf Caers and Vanessa Castelyns. 2011. LinkedIn and Facebook in Belgium: The Influences and Biases of Social Network Sites in Recruitment and Selection Procedures. Soc. Sci. Comput. Rev. 29, (Nov. 4, 2011), 437-448. DOI-10.1177/0894439310386567 http://dx.doi.org/10.1177/0894439310386567.

Bennet Hammer. 2014. A Picture is Worth a Thousand Words, but Are They the Words That Matter?—An Analysis of The Effects of Image Comments on Social Networking Sites. Doctoral dissertation. Nova Southeastern University. Retrieved from NSUWorks, Graduate School of Computer and Information Sciences. (172) http://nsuworks.nova.edu/gscis_etd/172.

Thorston Strufe. 2010. Profile popularity in a business-oriented online social network. SNS '10 Proceedings of the 3rd Workshop on Social Network Systems, Article No. 2, ACM New York, NY, ISBN: 978-1-4503-0080-3 doi>10.1145/1852658.1852660.

U.S. Appl. No. 15/244,717, filed Aug. 23, 2016, 2018/0061033 A1.

Notice of Allowanced dated Nov. 30, 2018 in corresponding U.S. Appl. No. 15/244,717.

\* cited by examiner

ENHANCED CONFIGURATION OF A PROFILE PHOTO SYSTEM

TECHNICAL FIELD

The present application relates generally to a system and method that can be used to determine, display, and create one or more images acceptable for one or more online networks having differing acceptability criteria.

BACKGROUND

Online social networks, such as LinkedIn, IBM Connections, Twitter, and Facebook, enable users to establish an online presence and identity to more easily connect with users. Often the users use sharing of personal information (profile photo, photos, thoughts, etc.) in order to create conversation, generate awareness, share information, and get business done.

Particularly in enterprise social networks, identity/personal information is first seen by viewing users through the profile photo. From these profile photos, a viewer can get important information that goes beyond mere identification. The person may have a sense of humor, a unique perspective, or an extra dose of character imbued by parenthood or hobbies.

In spite of promoting understanding of perspective, humor, and character, there is little utility in the profile photo due to the difficulty in translating a photograph into real-life identification, such as meeting at a conference. The problem originates with recognizing contradictory requirements for profile photos in an enterprise social computing platform. Good headshot photos help geographically dispersed teams form closer bonds by seeing their team members as more than just a text string identifying their names. Good headshot photos are particularly helpful when the team has to come together for face to face meetings or find one another in a crowded train station to meet up before proceeding to a customer meeting.

The contradiction arises between these utility needs of the enterprise versus the users' need to be expressive with their profile photos. There is a method needed for ensuring that a photo provided by a user actually meets the criteria for which it is intended.

SUMMARY

Embodiments can provide a computer implemented method in a data processing system comprising a processor and a memory, the memory comprising instructions that are executed by the processor to cause the processor to implement a system for providing profile photo enhancement, the method comprising receiving, from a specification source, one or more specifications for image acceptance criteria; receiving, from an uploading user, an image; examining, through an image processing toolbox, the image to determine if all of the image acceptance criteria are met; if all image acceptance criteria are met, accepting the image; and if one or more image acceptance criteria are not met, processing the image.

Embodiments can further provide a method further comprising receiving, from a specification source, one or more specifications for image acceptance criteria, wherein the image acceptance criteria include a pre-determined number of focus items; determining, through the image processing toolbox, the number of focus items present on the image; if the image fails to have exactly the pre-determined number of focus items, highlighting, on a display, the focus items; allowing the uploading user to select one or more correct focus items; cropping the image to only display the correct focus items; and re-examining the image to determine if all of the image acceptance criteria are met.

Embodiments can further provide a method further comprising receiving, from a specification source, one or more specifications for image acceptance criteria, wherein the image acceptance criteria include a pre-determined number of focus items; determining, through the image processing toolbox, the number of focus items present on the image; if the image fails to have exactly the pre-determined number of focus items, automatically cropping, by the image processing toolbox, the image to only display one or more correct focus items determined based on prior-known identity characteristics of the uploading user; and re-examining the image to determine if all of the image acceptance criteria are met.

Embodiments can further provide a method further comprising receiving, from a specification source, one or more specifications for image acceptance criteria, wherein the image acceptance criteria include pre-determined length and width constraints; determining, through the image processing toolbox, whether a primary focus item in the image meets the pre-determined length and width constraints; if the primary focus item in the image fails to meet the pre-determined length and width constraints, requesting the user to upload a replacement image that conforms with the pre-determined length and width constraints; and examining, through the image processing toolbox, the replacement image to determine if all of the image acceptance criteria are met.

Embodiments can further provide a method further comprising receiving, from a specification source, one or more specifications for image acceptance criteria, wherein image acceptance criteria include a pre-determined minimum number of distinct colors present in the image; determining, through the image processing toolbox, the number of distinct colors present in the image; if the image fails to have at least the pre-determined minimum number of colors, requesting the user to upload a replacement image having at least the pre-determined minimum number of colors; and examining, through the image processing toolbox, the replacement image to determine if all of the image acceptance criteria are met.

Embodiments can further provide a method further comprising receiving, from a specification source, one or more specifications for image acceptance criteria, wherein image acceptance criteria include a pre-determined contrast ratio between a primary focus item and a background; if the image fails to meet the pre-determined contrast ratio, adjusting, by the image processing toolbox, one or more image attributes of the image such that the image conforms with the pre-determined contrast ratio; and re-examining the image to determine if all of the image acceptance criteria are met.

Embodiments can further provide a method further comprising prompting the uploading user to categorize the image according to an intent associated with the specification of image acceptance criteria.

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise a profile photo enhancement processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Figure 1:
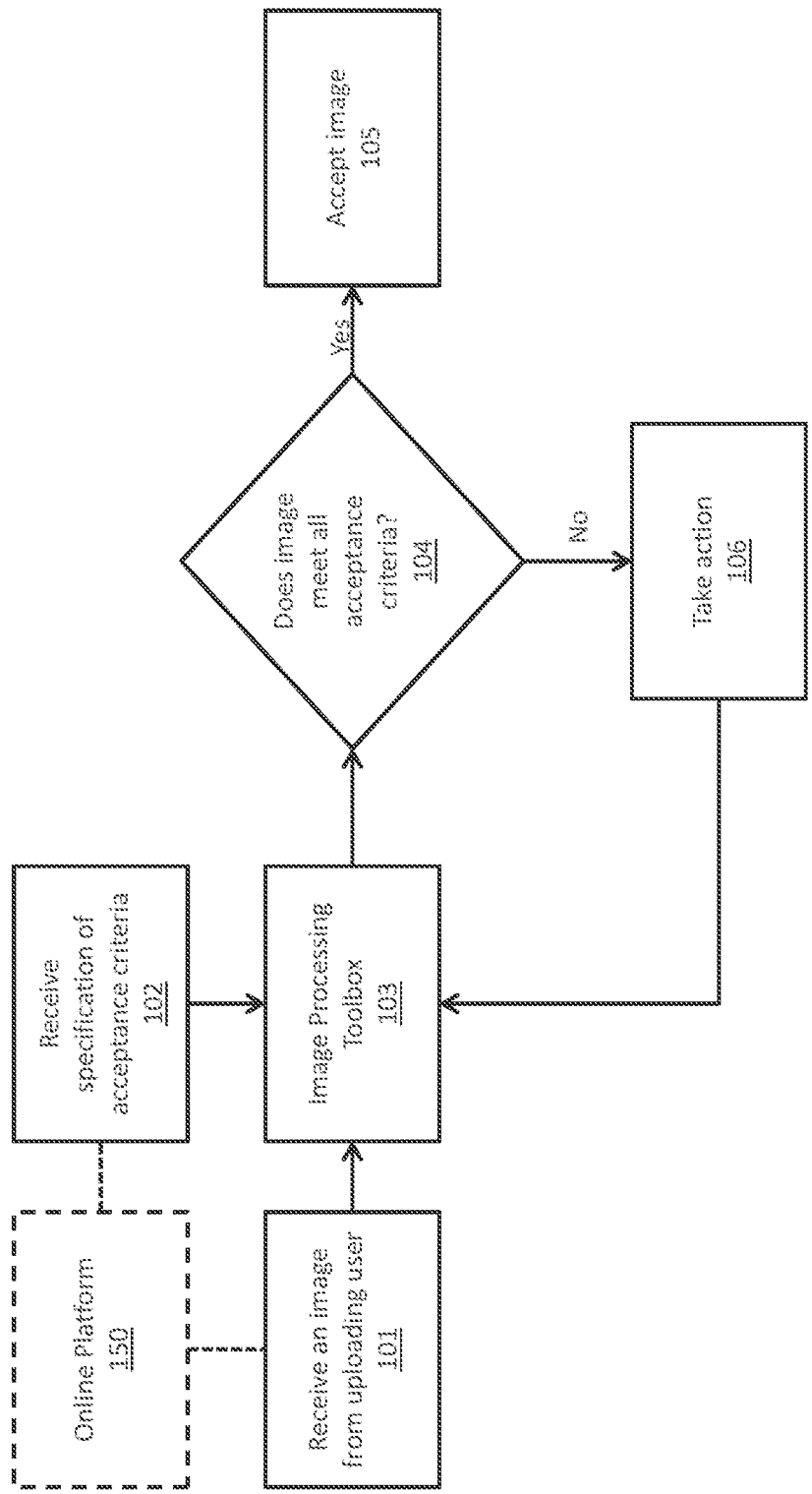
FIG. 1 depicts a flowchart illustrating the functionality of a profile photo enhancement system, according to embodiments described herein.

The profile photo enhancement system and method are an improvement on previously existing image processing technology. An uploading user can upload one or more images to the system. At the same time, the system can receive a specification of one or more acceptance criteria from an online platform (such as a social network) for which the image is to be displayed and uploaded. In an embodiment, the images can be examined against the acceptance criteria by an image processing toolbox. If the images fail one or more of the acceptance criteria, one or more actions can be taken, including having the images processed such that they meet those criteria, or discarding the images. In the event one or more of the images pass all acceptance criteria, the images can be accepted by the system for use on the online platform. Use can include display, by the online platform, of the accepted image as the uploading user's profile picture.

In an alternate embodiment, a requesting user requests to view an image of the uploading user. Based on the relationship between the requesting user and the uploading user, varying schemas of acceptance criteria may be applied. The uploading user, having uploaded one or more images, may have each image examined against the varying acceptance criteria. If an image fails to meet one or more acceptance criteria in one schema, the image may be rejected for that schema and reexamined under another schema. The image may be processed to meet a particular schema of acceptance criteria. If the image meets all acceptance criteria in a particular schema, the image can be accepted and displayed to the requesting user. The alternate embodiment can be of particular use for online platforms that allow an uploading user to display different images based upon the familiarity of the requesting user to the uploading user. For example, a requesting user with a previous relationship with the uploading user (exemplified by the requesting user and uploading user being "connected" or "friends" within the online platform), can be shown an informal, non-identification based image of the uploading user. In contrast, a requesting user without formal connection to the uploading user can be shown a formal image of the uploading user such that the image could be used by the requesting user to identify the uploading user in real-space.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a flowchart illustrating the functionality of a profile photo enhancement system, according to embodiments described herein. Through interaction with an online platform 150, the profile photo enhancement system can receive an image from an uploading user 101. The online platform 150 can be any online platform that uses images as personal identifiers, such as profile photos. Examples include social media platforms like Facebook or LinkedIn, but can also include enterprise solutions such as Slack or IBM Connections. The profile photo enhancement system can receive from the online platform 150 one or more specifications of acceptance criteria 102. These acceptance criteria can be dictated by the constraints of the online platform 150, and will be described in further detail herein.

In an embodiment, the uploading user may also indicate an intent to be associated with the image received 101, and this intent may be used as a parameter by the online platform 150 to select the acceptance criteria specification 102 to be received. For example, an uploading user may upload one image to represent an informal countenance to be used with direct connections in a social network, and another for a formal countenance to be used with any other requesting user who requests the profile photo of the uploading user.

Using an imaging processing toolbox 103, the image uploaded by the uploading user can be analyzed and compared against the acceptance criteria specification received from the online platform 150. The profile enhancement system can determine whether the uploaded image meets all of the acceptance criteria 104. If the image meets all acceptance criteria, the profile photo enhancement system can accept the image 105, and can also notify the uploading user of the image's acceptance. In an embodiment, acceptance of the image can constitute saving the image to a repository of profile images, or displaying the image on the online platform as the uploading user's profile image. If the uploaded image fails to meet one or more acceptance criteria, the profile photo enhancement system can proceed to take an action 106. In an embodiment, the action can be to discard the uploaded image, and can also include notifying the uploading user that the image was rejected. Alternately, the profile photo enhancement system can return the uploaded image to the image processing toolbox 103 in order for the image processing toolbox to edit or adjust the image based upon the one or more failed acceptance criteria.

Once edited, the uploaded image can be reexamined by the profile photo enhancement system to determine if the image now meets all acceptance criteria 104. If so, the image can be accepted 105; if not, the system can take further action 106. In an embodiment, the system can proceed for a predetermined number of analyses and edits before the image is ultimately discarded.

An acceptance criterion can be a predetermined number of focus items that must be present in the image. Focus items can include human faces. The image processing toolbox can detect the number of focus items present on the image. In the event the image processing toolbox detects more than the predetermined number of focus items, the system can highlight those focus items on a display. The uploading user can then manually select the particular focus items, such that the predetermined number of focus items is selected. The image processing toolbox can then crop the image to only display the correct focus items, at which point the image can be reexamined by the system. Alternately, if the image processing toolbox detects less than the predetermined number of focus items (which can occur if no focus items are present, or if the image is of such poor quality or low pixilation that the system cannot detect a focus item), the system can alert the uploading user that the image does not contain the needed amount of focus items, and can additionally prompt the uploading user to upload a second image for review by the image processing toolbox.

The profile photo enhancement system can utilize identity characteristics about the uploading user to automatically select a particular focus item. For instance, the system can receive gender information based upon information the uploading user had previously uploaded to the online platform. If the uploaded image contains two focus items, the image processing toolbox can determine whether the focus items show faces of different gender, and select the focus item corresponding to the uploading user's designated gender. A similar analysis can be performed to distinguish focus items based on ethnicity, age, or other personal characteristics that may be reflected in an uploaded image. The personal characteristic limits can be derived from analysis by the system of the uploading user's profile on the online platform. Natural language processing can be utilized to parse personal characteristics of the uploading user, which can be incorporated into the analysis of the image by the image processing toolbox. Alternately, if the uploaded image is non-deterministic generally, the system can store the image for use as an image to be displayed for familiar requesters, which will be described in more detail in FIG. 2.

Acceptance criteria can include predetermined length and width constraints for the image or primary focus item. Predetermined constraints can include a limitation on the overall dimensions of the image or primary focus item, the ratio of length to width, or minimum requirements regarding the same. If the system detects that the image or primary focus item fails to meet the predetermined length and width constraint, the image processing toolbox can manipulate the image in order for the image to conform to the constraints. Manipulation can include cropping, stretching, shrinking, or resizing the uploaded image.

Acceptance criteria can include predetermined color constraints for the image. Color constraints could require that the image be in black and white, greyscale, sepia, or entirely in color. In the event the color constraints require an image having black and white, greyscale, or sepia image, the uploading of a color image by the uploading user can trigger the image processing toolbox to convert the color image into black and white, greyscale, or sepia as the acceptance criteria dictate. Alternately, if the acceptance criteria require a color image and the uploading user uploads a non-colored or sepia image, the image processing toolbox, upon detecting a lack of color in the image, can trigger the profile photo enhancement system to notify the user that the image has been rejected due to lack of coloration, and a replacement colored image must be uploaded to the system.

Acceptance criteria can include a predetermined contrast ratio between a primary focus item and the image background. In the event the image uploaded by the uploading user is too washed out or too dark, the image processing toolbox can manipulate the image to make the image conform to the predetermined contrast ratio requirements. Manipulation can involve alteration of the image contrast, brightness, or sharpness. In the event the image processing toolbox cannot manipulate the image sufficiently to conform the image to the acceptance criteria, the profile photo enhancement system can disregard the image and prompt the uploading user to upload a supplementary or replacement image.

An acceptance criterion can be a predetermined shape constraint for an acceptable image. Various online platforms use different image geometries for use in their systems. For example, some online platforms require square images, while others require circular images. In the event the image fails to conform to the predetermined shape constraint, the image processing toolbox can manipulate the image such that the image conforms to the predetermined shape constraint. Manipulation can include cropping, stretching, shrinking, or resizing the uploaded image.

An acceptance criterion for specifications requiring the presence of a human face can be determining a predesignated orientation of the human face in the image. In an embodiment, the predesignated orientation can be facing forward and vertically oriented. The image processing toolbox can analyze the uploaded image to determine if the prerequisite features of the predesignated orientation exist. In a face forward model, prerequisite features can require the detection of two eyes above a nose above a mouth. Detection of a single eye above a nose above a mouth can indicate a side-profile view, which can cause the system to prompt the uploading user to upload an image conforming to the predesignated orientation.

It is understood that processing of the image by the image processing toolbox and reexamination by the profile photo enhancement system for various acceptance criteria can occur linearly or in synchronous fashion. The system can examine and/or process the image in multiple iterations in order to create a conforming image, or the system can alter multiple characteristics of the image at one time. For instance, a misshaped, colored, and multiple focused image can be processed by the image processing toolbox such that the image is cropped to the correct shape, where the crop excludes the non-primary focus items, and the image can be converted to the color scheme required by the online platform.

In an embodiment, the profile photo enhancement system can allow for images that do not conform to a particular specification of acceptance criteria to be stored for possible analysis against a second specification of acceptance criteria. For example, while a particular image may not be acceptable against the acceptance criteria for an enterprise social network, the image may be acceptable for the acceptance criteria of an informal social network. The profile photo enhancement system can store and notify users via a display of the potential alternate uses of a particular uploaded image.

Figure 2:
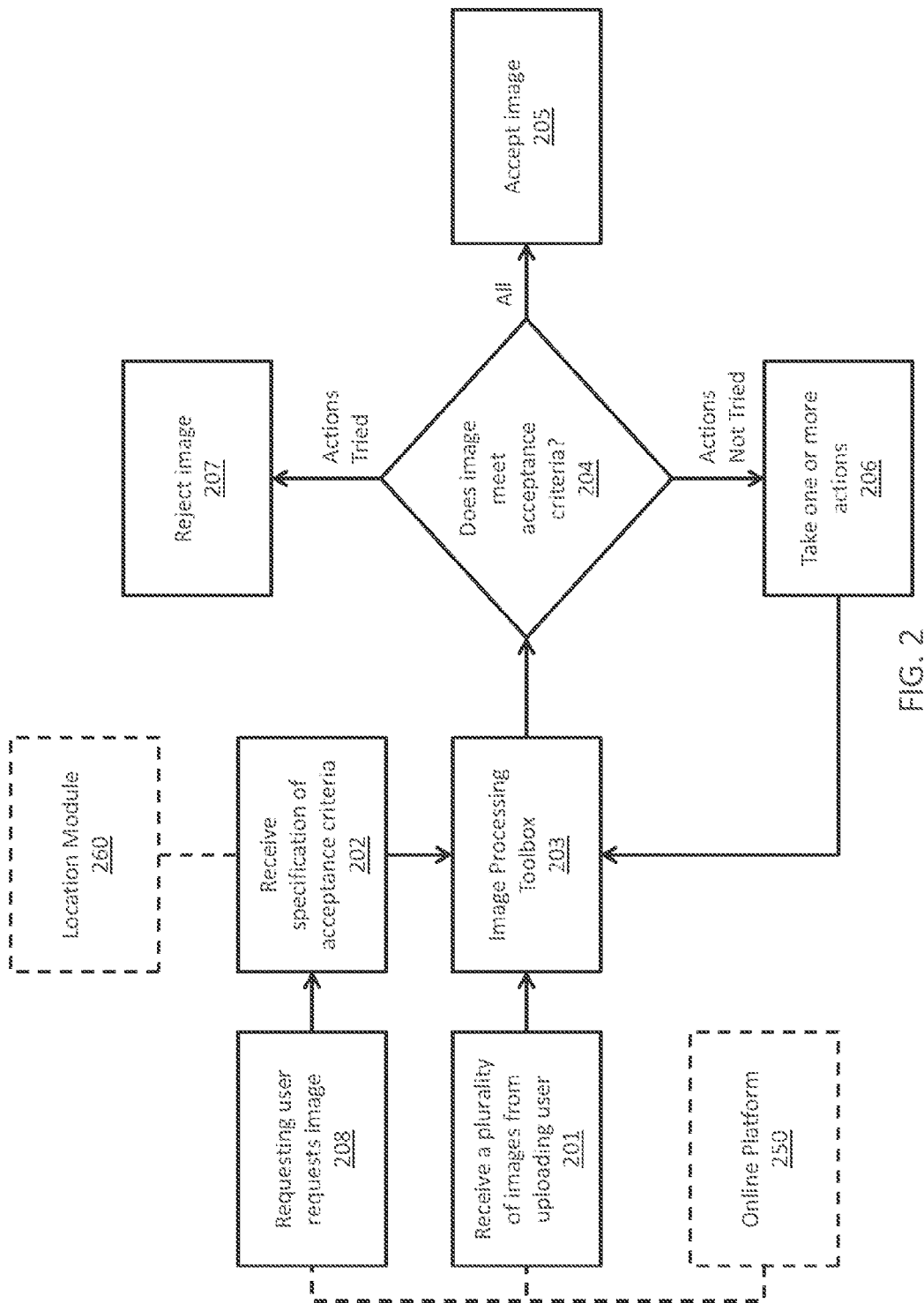
FIG. 2 depicts a flowchart illustrating alternate functionality of a profile photo enhancement system, according to embodiments described herein.

FIG. 2 depicts a flowchart illustrating alternate functionality of a profile photo enhancement system, according to embodiments described herein. Through interaction with an online platform 250, the profile photo enhancement system can receive a plurality of images from an uploading user 201. In an embodiment, the plurality of images can originate from a real-time, prompted upload of the user. Alternately, the plurality of images can originate from a repository of images that have been previously uploaded to the online platform, which can include images uploaded directly by the user, but can also include images uploaded by third parties in which the user has been previously identified.

The profile photo enhancement system can receive a request from a requesting user for an image of the uploading user 208. In an embodiment, a request from a requesting user can be triggered by the requesting user visiting the uploading user's unique profile on the online platform. Alternately, a request may be triggered by activation of a magnification of a previously displayed profile image by the requesting user.

The uploading of the plurality of images can occur concurrently with the requesting of the images, or the requesting of images can occur at some later time after the uploading and processing of images by the profile photo enhancement system. The online platform 250 can be any online platform that uses images as personal identifiers, such as profile photos. Examples include social media platforms like Facebook or LinkedIn, but can also include enterprise solutions such as Slack or IBM Connections. The profile photo enhancement system can receive from the online platform 250 one or more specifications of acceptance criteria 202. These acceptance criteria can be dictated by the constraints of the online platform 250 as well as by the relationship between the requesting user and the uploading user, and will be described in further detail herein.

Using an imaging processing toolbox 203, each image in the plurality of images uploaded by the uploading user can be analyzed and compared against the acceptance criteria specification. The profile enhancement system can determine whether each uploaded image meets the acceptance criteria 204. If an image meets all acceptance criteria, the profile photo enhancement system can accept the image 205. In an embodiment, acceptance of the image can constitute displaying the image on the online platform to the requesting user as the uploading user's profile photo. If an uploaded image fails to meet the acceptance criteria, the profile photo enhancement system can proceed to take one or more actions 206. In an embodiment, an action can be to discard the uploaded image for the particular set of acceptance criteria. However, the image can continue to be stored for analysis by the profile photo enhancement system against an alternate set of acceptance criteria, as the image may be acceptable in another context depending on a subsequent requesting user's relationship to the uploading user. A subsequent requesting user can be a separate individual, or can be the original requesting user having changed familiarity or locational relationships with the uploading user. Alternately, the profile photo enhancement system can return the uploaded image to the image processing toolbox 203 in order for the image processing toolbox to edit or adjust the image based upon the one or more failed acceptance criteria, much in the same manner as described in FIG. 1.

Once edited, the processed image can be reexamined by the profile photo enhancement system to determine if the image now meets all the acceptance criteria 204. If so, the processed image can be accepted 205; if not, the system can reject the processed image 207 as a response to the current image request 208. However, the original unedited image can remain in storage for analysis under an alternate specification of acceptance criteria.

In one embodiment, for a particular image request 208, the images of the plurality received 201 can be examined until an image is accepted 205 or until all images in the plurality have been rejected 207. If an accepted image is found, it can be provided to the requesting user as a response to the request. Otherwise, the profile photo enhancement system can provide an alternative to an uploaded image as the response to the image request 208, such as a blank silhouette of a person.

In addition to the specification of acceptance criteria being defined by the constraints of the online platform 250 (as described in FIG. 1), the acceptance criteria can additionally be varied by the relationship of the requesting user to the uploading user. This capability is particularly useful in online platforms 250 that allow for a variable display of photos based on the relationship between its users, but can be used on any online platform that allows alteration of profile photos.

Acceptance criteria can be varied based upon the familiarity of the requesting user to the uploading user. Many online platforms allow users to establish formal connections, such as through the use of friend or connection requests. Thus, the acceptance criteria by which the plurality of images uploaded by the uploading user is measured can alter based upon whether a formal connection between the requesting user and the uploading user has been established. For example, a request for an image by a requesting user having a formal connection with the uploading user can allow the system to receive relaxed acceptance criteria, such as disregarding a restriction on focus items present in the uploaded image. Thus, the requesting user can view images uploaded by the uploading user that do not necessary have to show a focus item, such as a human face, and can instead view a profile image that may reflect the uploading user's personality (for example, artwork or images of the uploading user's family). In contrast, a request for an image by a requesting user lacking a formal connection with the uploading user can allow the system to receive strict acceptance criteria, such that an acceptable image may only be a profile photo showing the user's face, or other "utilitarian" image.

Acceptance criteria can be altered not only based upon the presence or absence of a formal connection between the requesting user and the uploading user, but can also alter based upon the duration the formal connection has been in place. In an embodiment, the longer the duration of the formal connection, the laxer the acceptance criteria received by the profile photo enhancement system can be. Similarly, the shorter the duration of the formal connection, the stricter the acceptance criteria. In an embodiment, a predetermined formal connection time can be used to trigger between strict or lax criteria. Thus, a requesting user having a newer formal relationship can be shown a utilitarian profile photo conforming to stricter acceptance criteria, while a requesting user having an older formal relationship can be shown a profile photo with laxer requirements, which may be more expressive of the uploading user's personality.

Acceptance criteria can be altered based upon the locational relationship between the requesting user and the uploading user. The profile photo enhancement system can use a location module 260 to determine the relative locations of the requesting user and the uploading user. In an embodiment, the location module 260 can incorporate geofencing capability, such that a proscribed boundary can be implemented. If a requesting user is within a certain distance of the uploading user, the acceptance criteria can be strengthened or relaxed depending on the requirements of the online platform. For example, in an enterprise online platform, a requesting user being within the geofence boundary (which can be placed such that it encompasses an office of the enterprise) can trigger a relaxation of the acceptance criteria, whereas a user outside the geofence can trigger stricter acceptance criteria. Alternately, close proximity of the requesting user to the uploading user can trigger strict acceptance criteria (which can result in an image being displayed that is more conducive to physical identification of the uploading user), while greater separation between the requesting user and the uploading user can trigger stricter acceptance criteria.

As with the online platform acceptance criteria described in FIG. 1, the profile photo enhancement system can consider each variable affecting the acceptance criteria in isolation or in any amount of combination. Additionally, the system can allow the uploading user to pre-identify images as potentially being acceptable for strict or relaxed acceptance criteria. The system may bind the various images as sprites, layered GIFs, layered PNGs, or other dual display images. The profile photo enhancement system can include an additional managerial approval mechanism, whereby a manager can override the selections of an uploading user, and/or can deny or approve uploaded photos for potential display by the online platform.

Figure 3:
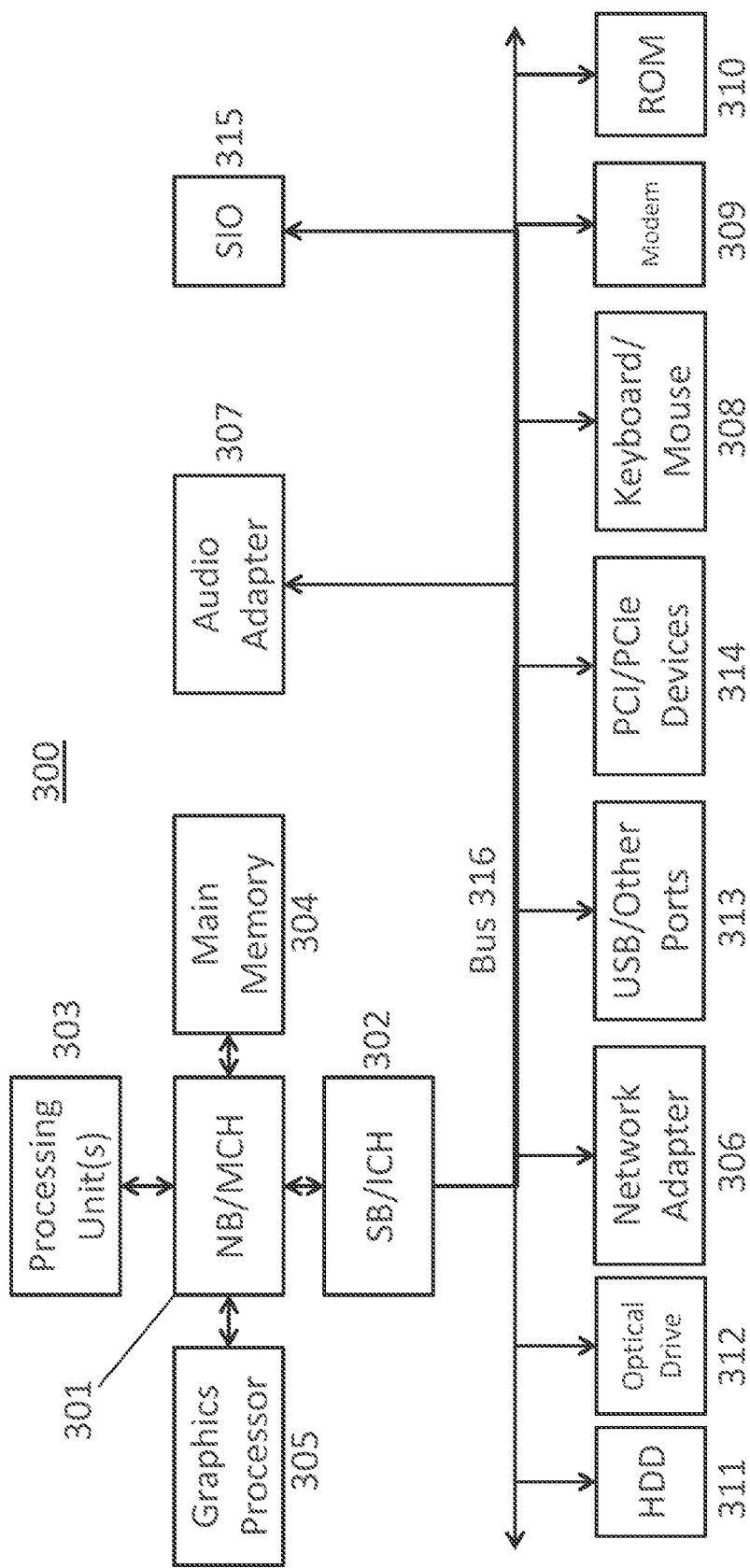
FIG. 3 is a block diagram of an example data processing system in which aspects of the illustrative embodiments may be implemented.

FIG. 3 is a block diagram of an example data processing system 300 in which aspects of the illustrative embodiments can be implemented. Data processing system 300 is an example of a computer, such as a server or client, in which computer usable code or instructions implementing the process for illustrative embodiments of the present invention are located. In one embodiment, FIG. 3 represents a server computing device, such as a server, which implements the profile photo enhancement system described herein.

In the depicted example, data processing system 300 can employ a hub architecture including a north bridge and memory controller hub (NB/MCH) 301 and south bridge and input/output (I/O) controller hub (SB/ICH) 302. Processing unit 303, main memory 304, and graphics processor 305 can be connected to the NB/MCH 301. Graphics processor 305 can be connected to the NB/MCH through an accelerated graphics port (AGP).

In the depicted example, the network adapter 306 connects to the SB/ICH 302. The audio adapter 307, keyboard and mouse adapter 308, modem 309, read only memory (ROM) 310, hard disk drive (HDD) 311, optical drive (CD or DVD) 312, universal serial bus (USB) ports and other communication ports 313, and the PCI/PCIe devices 314 can connect to the SB/ICH 302 through bus system 316. PCI/PCIe devices 314 may include Ethernet adapters, add-in cards, and PC cards for notebook computers. ROM 310 may be, for example, a flash basic input/output system (BIOS). The HDD 311 and optical drive 312 can use an integrated drive electronics (IDE) or serial advanced technology attachment (SATA) interface. The super I/O (SIO) device 315 can be connected to the SB/ICH.

An operating system can run on processing unit 303. The operating system can coordinate and provide control of various components within the data processing system 300. As a client, the operating system can be a commercially available operating system. An object-oriented programming system, such as the Java™ programming system, may run in conjunction with the operating system and provide calls to the operating system from the object-oriented programs or applications executing on the data processing system 300. As a server, the data processing system 300 can be an IBM® eServer™ System P® running the Advanced Interactive Executive operating system or the Linux operating system. The data processing system 300 can be a symmetric multiprocessor (SMP) system that can include a plurality of processors in the processing unit 303. Alternatively, a single processor system may be employed.

Instructions for the operating system, the object-oriented programming system, and applications or programs are located on storage devices, such as the HDD 311, and are loaded into the main memory 304 for execution by the processing unit 303. The processes for embodiments of the profile photo enhancement system can be performed by the processing unit 303 using computer usable program code, which can be located in a memory such as, for example, main memory 304, ROM 310, or in one or more peripheral devices.

A bus system 316 can be comprised of one or more busses. The bus system 316 can be implemented using any type of communication fabric or architecture that can provide for a transfer of data between different components or devices attached to the fabric or architecture. A communication unit such as the modem 309 or network adapter 306 can include one or more devices that can be used to transmit and receive data.

Those of ordinary skill in the art will appreciate that the hardware depicted in FIG. 3 may vary depending on the implementation. Other internal hardware or peripheral devices, such as flash memory, equivalent non-volatile memory, or optical disk drives may be used in addition to or in place of the hardware depicted. Moreover, the data processing system 300 can take the form of any of a number of different data processing systems, including but not limited to, client computing devices, server computing devices, tablet computers, laptop computers, telephone or other communication devices, personal digital assistants, and the like. Essentially, data processing system 300 can be any known or later developed data processing system without architectural limitation.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer implemented method in a data processing system comprising a processor and a memory, the memory comprising instructions that are executed by the processor to cause the processor to implement a system for providing profile photo enhancement, the method comprising:
   receiving, from a specification source, one or more specifications for image acceptance criteria, wherein the image acceptance criteria include a pre-determined contrast ratio between a primary focus item and a background;
   receiving, from an uploading user, an image;
   examining, through an image processing toolbox, the image to determine if all of the image acceptance criteria are met;
   if all image acceptance criteria are met, accepting the image; and
      if one or more image acceptance criteria are not met, processing the image, wherein if the image fails to meet the pre-determined contrast ratio,
      adjusting, by the image processing toolbox, one or more image attributes of the image such that the image conforms with the pre-determined contrast ratio; and
      re-examining the image to determine if all of the image acceptance criteria are met.

2. The method as recited in claim 1, further comprising:
   receiving, from a specification source, one or more specifications for image acceptance criteria, wherein the image acceptance criteria include a pre-determined number of focus items;
   determining, through the image processing toolbox, the number of focus items present on the image;
   if the image fails to have exactly the pre-determined number of focus items, highlighting, on a display, the focus items;
   allowing the uploading user to select one or more correct focus items;
   cropping the image to only display the correct focus items; and
   re-examining the image to determine if all of the image acceptance criteria are met.

3. The method as recited in claim 1, further comprising:
   receiving, from a specification source, one or more specifications for image acceptance criteria, wherein the image acceptance criteria include a pre-determined number of focus items;
   determining, through the image processing toolbox, the number of focus items present on the image;
   if the image fails to have exactly the pre-determined number of focus items, automatically cropping, by the image processing toolbox, the image to only display one or more correct focus items determined based on prior-known identity characteristics of the uploading user; and
   re-examining the image to determine if all of the image acceptance criteria are met.

4. The method as recited in claim 1, further comprising:
   receiving, from a specification source, one or more specifications for image acceptance criteria, wherein the image acceptance criteria include pre-determined length and width constraints;
   determining, through the image processing toolbox, whether a primary focus item in the image meets the pre-determined length and width constraints;
   if the primary focus item in the image fails to meet the pre-determined length and width constraints, requesting the user to upload a replacement image that conforms with the pre-determined length and width constraints; and
   examining, through the image processing toolbox, the replacement image to determine if all of the image acceptance criteria are met.

5. The method as recited in claim 1, further comprising:
   receiving, from a specification source, one or more specifications for image acceptance criteria, wherein image acceptance criteria include a pre-determined minimum number of distinct colors present in the image;
   determining, through the image processing toolbox, the number of distinct colors present in the image;
   if the image fails to have at least the pre-determined minimum number of colors, requesting the user to upload a replacement image having at least the pre-determined minimum number of colors; and
   examining, through the image processing toolbox, the replacement image to determine if all of the image acceptance criteria are met.

6. The method as recited in claim 1, further comprising:
   prompting the uploading user to categorize the image according to an intent associated with the specification of image acceptance criteria.

7. A computer program product for profile photo enhancement, the computer program product comprising a computer readable storage medium having program instructions embodied therewith, the program instructions executable by a processor to cause the processor to:
   receive, from a specification source, one or more specifications for image acceptance criteria, wherein the image acceptance criteria include a pre-determined contrast ratio between a primary focus item and a background;
   receive, through a user, an image;
   examine, through an image processing toolbox, the image to determine if all of the image acceptance criteria are met;
   if all image acceptance criteria are met, accept the image; and
      if one or more image acceptance criteria are not met, process the image,
      wherein if the image fails to meet the pre-determined contrast ratio,
         adjust, by the image processing toolbox, one or more image attributes of the image such that the image conforms with the pre-determined contrast ratio; and
         re-examine the image to determine if all of the image acceptance criteria are met.

8. The computer program product as recited in claim 7, wherein the processor is further configured to:
   receive, from a specification source, one or more specifications for image acceptance criteria, wherein image acceptance criteria include a pre-determined number of focus items;
   determine, through the image processing toolbox, the number of focus items present on the image;
   if the image fails to have exactly the pre-determined number of focus items, highlight, on a display, the focus items;
   allow the user to select one or more correct focus items;
   crop the image to only display the correct focus items; and
   re-examine the image to determine if all of the image acceptance criteria are met.

9. The computer program product as recited in claim 7, wherein the processor is further configured to:
receive, from a specification source, one or more specifications for image acceptance criteria, wherein image acceptance criteria include a pre-determined number of focus items;
determine, through the image processing toolbox, the number of focus items present on the image;
if the image fails to have exactly the pre-determined number of focus items, automatically crop, by the image processing toolbox, the image to cover one or more correct focus items determined based on prior-known identity characteristics of the user; and
re-examine the image to determine if all of the image acceptance criteria are met.

10. The computer program product as recited in claim 7, wherein the processor is further configured to:
receive, from a specification source, one or more specifications for image acceptance criteria, wherein the image acceptance criteria include pre-determined length and width constraints;
determine, through the image processing toolbox, whether a primary focus item in the image meets the pre-determined length and width constraints;
if the primary focus item in the image fails to meet the pre-determined length and width constraints, request the user to upload a replacement image that conforms with the pre-determined length and width constraints; and
examine, through the image processing toolbox, the replacement image to determine if all of the image acceptance criteria are met.

11. The computer program product as recited in claim 7, wherein the processor is further configured to:
receive, from a specification source, one or more specifications for image acceptance criteria, wherein image acceptance criteria include a pre-determined minimum number of distinct colors present in the image;
determine, through the image processing toolbox, the number of distinct colors present in the image;
if the image fails to have at least the pre-determined minimum number of colors, request the user to upload a replacement image having at least the pre-determined minimum number of colors; and
examine, through the image processing toolbox, the replacement image to determine if all of the image acceptance criteria are met.

12. The computer program product as recited in claim 7, wherein the processor is further configured to:
prompt the uploading user to categorize the image according to an intent associated with the specification of image acceptance criteria.

13. A system for profile photo enhancement, comprising:
a profile photo enhancement processor configured to:
receive, from a specification source, one or more specifications for image acceptance criteria, wherein the image acceptance criteria include a pre-determined contrast ratio between a primary focus item and a background;
receive, through a user, an image;
examine, through an image processing toolbox, the image to determine if all of the image acceptance criteria are met;
if all image acceptance criteria are met, accept the image; and
if one or more image acceptance criteria are not met, process the image,
wherein if the image fails to meet the pre-determined contrast ratio,
adjust, by the image processing toolbox, one or more image attributes of the image such that the image conforms with the pre-determined contrast ratio; and
re-examine the image to determine if all of the image acceptance criteria are met.

14. The system as recited in claim 13, wherein the profile photo enhancement processor is further configured to:
receive, from a specification source, one or more specifications for image acceptance criteria, wherein image acceptance criteria include a pre-determined number of focus items;
determine, through the image processing toolbox, the number of focus items present on the image;
if the image fails to have exactly the pre-determined number of focus items, highlight, on a display, the focus items;
allow the user to select one or more correct focus items;
crop the image to only display the correct focus items; and
re-examine the image to determine if all of the image acceptance criteria are met.

15. The system as recited in claim 13, wherein the profile photo enhancement processor is further configured to:
receive, from a specification source, one or more specifications for image acceptance criteria, wherein image acceptance criteria include a pre-determined number of focus items;
determine, through the image processing toolbox, the number of focus items present on the image;
if the image fails to have exactly the pre-determined number of focus items, automatically crop, by the image processing toolbox, the image to cover one or more correct focus items determined based on prior-known identity characteristics of the user; and
re-examine the image to determine if all of the image acceptance criteria are met.

16. The system as recited in claim 13, wherein the profile photo enhancement processor is further configured to:
receive, from a specification source, one or more specifications for image acceptance criteria, wherein the image acceptance criteria include pre-determined length and width constraints;
determine, through the image processing toolbox, whether a primary focus item in the image meets the pre-determined length and width constraints;
if the primary focus item in the image fails to meet the pre-determined length and width constraints, request the user to upload a replacement image that conforms with the pre-determined length and width constraints; and
examine, through the image processing toolbox, the replacement image to determine if all of the image acceptance criteria are met.

17. The system as recited in claim 13, wherein the profile photo enhancement processor is further configured to:
receive, from a specification source, one or more specifications for image acceptance criteria, wherein image acceptance criteria include a pre-determined minimum number of distinct colors present in the image;
determine, through the image processing toolbox, the number of distinct colors present in the image;
if the image fails to have at least the pre-determined minimum number of colors, request the user to upload a replacement image having at least the pre-determined minimum number of colors; and examine, through the image processing toolbox, the replacement image to determine if all of the image acceptance criteria are met.

* * * * *